United States Patent [19]

Brothers et al.

[11] Patent Number: 4,742,094

[45] Date of Patent: May 3, 1988

[54] LOW FLUID LOSS SALT SATURATED CEMENT SLURRIES, ADDITIVES AND METHODS

[75] Inventors: Lance E. Brothers, Ninnekah; John F. Burkhalter, Duncan, both of Okla.

[73] Assignee: Halliburton Company, Duncan, Okla.

[21] Appl. No.: 912,757

[22] Filed: Sep. 25, 1986

[51] Int. Cl.$^4$ .............................................. C08L 97/00
[52] U.S. Cl. .................................. 523/130; 166/293; 524/2; 524/542
[58] Field of Search .................... 523/130, 131; 524/2, 524/542

[56] References Cited

U.S. PATENT DOCUMENTS

| | | | |
|---|---|---|---|
| 3,491,049 | 1/1970 | Gibson et al. | 260/29.2 |
| 3,511,314 | 5/1970 | Scott, Jr. et al. | 166/293 |
| 3,998,773 | 12/1976 | Crinkelmeyer | 260/29.2 |
| 4,054,462 | 10/1977 | Stude | 523/130 |
| 4,125,160 | 11/1978 | Crinkelmeyer et al. | 166/293 |
| 4,131,578 | 12/1978 | Crinkelmeyer et al. | 260/17.5 |
| 4,210,455 | 7/1980 | Metcalf et al. | 106/90 |
| 4,413,681 | 11/1983 | McKenzie | 166/293 |
| 4,461,856 | 7/1984 | Willis et al. | 523/401 |
| 4,469,518 | 9/1984 | McKenzie | 106/90 |
| 4,479,826 | 10/1984 | Papalos et al. | 106/90 |
| 4,537,918 | 8/1985 | Parcevaux | 523/130 |

OTHER PUBLICATIONS

*McCutcheon's Functional Materials*, North American Edition 1982, p. 102.

*Primary Examiner*—C. Warren Ivy
*Attorney, Agent, or Firm*—Robert A. Kent

[57] ABSTRACT

Low fluid loss salt saturated cement slurries, liquid fluid loss reducing additives for preparing slurries and methods of using the slurries in oil and gas well cementing operations are provided. The low fluid loss aqueous salt saturated cement slurries are comprised of hydraulic cement, salt saturated water and the reaction product of polyethyleneimine and one or more sulfonated organic compounds.

12 Claims, No Drawings

LOW FLUID LOSS SALT SATURATED CEMENT SLURRIES, ADDITIVES AND METHODS

BACKGROUND OF THE INVENTION

1. Field of the Invention

The present invention relates to low fluid loss salt saturated cement slurries, additives and methods of use in oil and gas well cementing operations.

2. Description of the Prior Art

In oil and gas well primary cementing, a hydraulic cement slurry is pumped down a well bore penetrating a subterranean formation through a steel conduit disposed in the well bore and back up through the annulus between the conduit and the well bore. Upon setting, the cement bonds and supports the conduit within the well bore and prevents fluid movement between subterranean formations penetrated by the well bore. To be useful as an oil field cementing slurry, the cement slurry, among other things, must be capable of allowing adequate placement time before setting, have low viscosity while being pumped, resist fluid loss into subterranean formations, have low free water separation and have rapid short-term strength development.

In a number of primary cementing applications, the use of aqueous salt saturated cement slurries is advantageous. The salt, generally sodium chloride, functions as a dispersant in the slurry, and causes the slurry to expand upon setting whereby the attainment of a good bond between the well bore and casing upon setting of the slurry is enhanced. In addition, aqueous salt saturated cement slurries help prevent the swelling of clays and the sloughing of salt-containing shale and other formations which in turn prevent problems such as bridging and lost circulation.

In remote or offshore locations where the availability of bulk blending equipment is limited, liquid fluid loss reducing additives for forming low fluid loss cement slurries are advantageous. Such liquid additives can be added directly to the water used to form the slurry without the need for special mixing equipment.

By the present invention, low fluid loss salt saturated cement slurries, liquid additives for use in forming such slurries and methods of using the slurries are provided.

SUMMARY OF THE INVENTION

Low fluid loss, low viscosity aqueous salt saturated cement slurries are provided comprised of hydraulic cement, salt saturated water present in an amount sufficient to form a pumpable slurry, and a fluid loss reducing complex comprised of the reaction product of polyethyleneimine having a molecular weight above about 50,000 and a sulfonated organic compound. The sulfonated organic compound is selected from the group consisting of lignosulfonic acid salts having Na, Ca, or $NH_4$ as the associated cation, naphthalene sulfonic acid condensed with formaldehyde having a molecular weight above about 5,000, and mixtures of such compounds.

The cement slurries can be prepared by combining the individual chemicals forming the reaction product directly, i.e., the polyethyleneimine and sulfonated organic compound can be combined directly with the mixing water utilized prior to combining hydraulic cement and salt therewith; or a liquid fluid loss reducing additive of the present invention described hereinbelow can be combined with the mixing water. The individual chemicals cannot be combined with the mixing water after the salt has been combined therewith in that the fluid loss reducing reaction product will not adequately form in the presence of the salt.

The liquid fluid loss reducing additives of this invention are comprised of water, a base present in the water in an amount sufficient to raise the pH thereof to a level in the range of from about 13 to about 14, polyethyleneimine having a molecular weight above about 50,000 and a sulfonated organic compound selected from the group consisting of lignosulfonic acid salts having Na, Ca, or $NH_4$ as the associated cation, naphthalene sulfonic acid condensed with formaldehyde having a molecular weight above about 5,000, and mixtures of such sulfonated organic compounds.

Methods of using the low fluid loss aqueous salt saturated cement slurries of the invention for cementing oil and gas wells are also provided. The methods are comprised of introducing a low fluid loss aqueous salt saturated cement slurry into the annulus between a conduit disposed in a well bore penetrating a subterranean formation and the well bore, and allowing the slurry to set therein.

The slurries have reasonable thickening times, low free water values, good rheological properties, exhibit rapid short-term strength development and have low fluid loss.

The features, advantages and objects of the invention recited above, as well as others, will be well understood by those skilled in the art upon a reading of the description of preferred embodiments which follows.

DESCRIPTION OF PREFERRED EMBODIMENTS

The low fluid loss aqueous salt saturated cement slurries of the present invention exhibit low water loss to permeable formations contacted by the slurries during and after placement in a zone to be cemented. Once placed, the slurries set into hard masses having required strengths and other characteristics.

While various hydraulic cements can be utilized in forming the slurries, Portland cements of the various types identified as API Classes A through H and J cements are commonly utilized. These cements are identified and defined in *API Specification for Materials and Testing for Well Cements*, API Spec. 10, 3rd Edition, July 1, 1986, of the American Petroleum Institute which is incorporated herein by reference.

The low fluid loss aqueous salt saturated cement slurries of this invention are comprised of hydraulic cement, preferably an API Class A through H or J Portland cement, salt (generally sodium chloride) saturated water present in an amount sufficient to form a pumpable slurry and a fluid loss reducing complex comprised of the reaction product of polyethyleneimine having a molecular weight above about 50,000 and a sulfonated organic compound selected from the group consisting of lignosulfonic acid salts having Na, Ca, or $NH_4$ as the associated cation, naphthalene sulfonic acid condensed with formaldehyde having a molecular weight above about 5,000, and mixtures of such compounds.

The mixing water for the slurries can be fresh water, brine or sea water, and the mixing water is salt saturated by the addition of salt thereto either before or during mixing with the hydraulic cement used. When sea water is utilized as the mixing water for a slurry, sodium hydroxide is combined therewith in an amount sufficient to precipitate magnesium ion present in the sea water as magnesium hydroxide prior to combining the other components of the slurry with the water.

The liquid fluid loss reducing additive of this invention which can be utilized to form a low water loss saturated salt slurry of the invention is comprised of the reaction product of polyethyleneimine having a molecular weight above about 50,000, preferably 80,000, and a sulfonated organic compound selected from the group consisting of lignosulfonic acid salts having Na, Ca, or $NH_4$ as the associated cation, naphthalene sulfonic acid condensed with formaldehyde having a molecular weight above about 5,000, and mixtures of such compounds.

As mentioned above, the polyethyleneimine and sulfonated organic compound can be added directly to the mixing water utilized for forming the cement slurry wherein they react to form the fluid loss reducing reaction product, but the water cannot be saturated with salt when the addition is made. That is, the addition of the individual chemicals which react to form the fluid loss reducing complex must be added to the water prior to saturating the water with salt, and most preferably, prior to combining the salt, hydraulic cement and any other components utilized in the slurry with the water.

The sulfonated organic compounds suitable for use in accordance with this invention are lignosulfonic acid salts, e.g., sodium, calcium or ammonium lignosulfonates, and naphthalene sulfonic acid condensed with formaldehyde having a molecular weight above about 5000, preferably 8000. While, for reasons which are not presently understood, some experimentally prepared lignosulfonates were not operable, commercially available sodium, calcium or ammonium lignosulfonates and naphthalene sulfonic acid condensed with formaldehyde, either by themselves or in admixture, react with polyethyleneimine to form a polymer complex which functions to reduce fluid loss from aqueous salt saturated cement slurries.

The fluid loss reducing complex comprised of the reaction product of polyethyleneimine and the sulfonated organic compound or compounds used is preferably present in the cement slurry in an amount in the range of from about 0.25% to about 2% by weight of dry cement utilized, most preferably in an amount of about 1% by weight of dry cement utilized.

The relative quantities of the polyethyleneimine and sulfonated organic compound forming the reaction product can vary. Preferably, the polyethyleneimine is added in an amount in the range of from about 0.5% to about 1.5% by weight of the dry cement utilized, most preferably about 0.7% by weight, and the sulfonated organic compound or compounds are added in an amount in the range of from about 0.2% to about 0.5% by weight of dry cement utilized, most preferably about 0.3% by weight.

A particularly preferred low fluid loss aqueous salt saturated cement slurry of the present invention is comprised of hydraulic cement, sodium chloride saturated water present in an amount sufficient to form a pumpable slurry, and a fluid loss reducing complex comprised of the reaction product of polyethyleneimine having a molecular weight of about 80,000 and sulfonated organic compounds comprised of a mixture of sodium lignosulfonate having Na, Ca, or $NH_4$ as the associated cation and naphthalene sulfonic acid condensed with formaldehyde having a molecular weight of about 8,000. The fluid loss reducing complex formed is preferably present in the salt saturated cement slurry in an amount in the range of from about 0.25% to about 2% by weight of dry cement utilized, most preferably about 1% by weight. The complex is preferably the reaction product of polyethyleneimine added in an amount in the range of from about 0.5% to about 1.5% by weight of dry cement, most preferably about 0.7% by weight, sodium lignosulfonate added in an amount in the range of from about 0.1% to about 0.3% by weight of dry cement, most preferably about 0.15% by weight, and naphthalene sulfonic acid condensed with formaldehyde added in an amount in the range of from about 0.1% to about 0.3% by weight of dry cement, most preferably about 0.15% by weight.

The liquid fluid loss reducing additives which can be utilized to prepare the low fluid loss aqueous salt saturated cement slurries are preferably combined with the slurry mixing water prior to adding other components thereto. The liquid additives are comprised of water, a base present in the water in an amount sufficient to raise the pH thereof to a level in the range of from about 13 to about 14, and the reaction product formed from polyethyleneimine having a molecular weight above about 50,000 and a sulfonated organic polymer selected from the group consisting of sodium, calcium or ammonium lignosulfonates, naphthalene sulfonic acid condensed with formaldehyde having a molecular weight above about 5,000, and mixtures of such compounds.

The water utilized for forming the additive must be fresh water. The base used to adjust the pH can be any suitable strongly basic compound such as sodium hydroxide, potassium hydroxide or ammonium hydroxide. The addition of the base and the corresponding increase in the pH of the water allow the additives to have relatively long shelf lives without appreciable phase separation.

Polyethyleneimine is preferably added to a liquid additive of this invention in an amount in the range of from about 7% to about 15% by weight of the additive, most preferably about 12% by weight, with the sulfonated organic compound being added in an amount in the range of from about 2% to about 8% by weight of the additive, most preferably about 5% by weight. The resulting fluid loss reaction product formed from the polyethyleneimine and sulfonated organic compound or compounds is present in the additive in an amount in the range of from about 9% to about 23% by weight of the additive.

The most preferred liquid fluid loss reducing additive of this invention is comprised of fresh water, sodium hydroxide present in the water in an amount sufficient to raise the pH thereof to a level of about 14, polyethyleneimine added to the additive in an amount in the range of from about 7% to about 15% by weight of the additive, most preferably about 12% by weight, sodium lignosulfonate added in an amount in the range of from about 1% to about 5% by weight of the additive, most preferably about 2.5% by weight, and naphthalene sulfonic acid condensed with formaldehyde having a molecular weight of about 8,000 added in an amount in the range of from about 1% to about 5% by weight of the additive, most preferably about 2.5% by weight.

In preparing a low fluid loss aqueous salt saturated cement slurry of the present invention using the liquid fluid loss reducing additive, the additive is combined with the mixing water in an amount in the range of from about 2% by weight to about 9% by weight of dry cement to be used, most preferably about 5% by weight of dry cement.

The low fluid loss salt saturated cement slurries of the present invention can include other components such as silica flour to prevent cement strength deterioration in high temperature environments and sodium silicate to prevent the formation of free water in the cement slurry and improve thickening times. When silica flour is used it is preferably present in the slurry in an amount in the range of from about 20% to about 40% by weight of dry cement used. When sodium silicate is used, it is preferably present in the slurry in an amount in the range of from about 1% to about 3% by weight of dry cement used.

In using a low viscosity aqueous salt saturated slurry of the present invention for the primary cementing of an oil or gas well, the slurry is introduced into the annulus between the well bore and a conduit disposed therein. Generally, a steel casing and/or liner is disposed in the well which can extend from the surface to the formation or to a point between the surface and the formation. In order to bond and support the casing and/or liner in the well bore and prevent communication between formations or to the surface by way of the annulus between the outside of the casing and the well bore, a cement slurry is pumped downwardly within the casing or liner to the bottom end thereof and then upwardly in the annulus. After placement in the annulus, the cement slurry sets into a hard mass whereby the casing or liner is sealingly bonded to the walls of the well bore.

In accordance with the method of the present invention, a conduit in a well bore penetrating a subterranean formation is cemented by introducing a low fluid loss, low viscosity aqueous salt saturated cement slurry of the present invention into the annulus between the conduit and the well bore and allowing the slurry to set therein.

In order to further illustrate the present invention and to facilitate a clear understanding of the slurries, additives and methods thereof, the following examples are given.

EXAMPLE 1

Various aqueous salt saturated cement slurries are prepared comprised of salt saturated fresh water, cement, silica flour and a fluid loss reducing component comprised of polyethyleneimine having a molecular weight of about 80,000 and various sulfonated organic compounds. The slurries are tested for free water, fluid loss and thickening time in accordance with API standard procedures. The results of these tests are given in Table I below.

TABLE I

Properties of 16.1 lb/gal Cement Slurries Comprised of Class H Cement, Sodium Chloride Saturated Fresh Water, 35% by Weight (of dry cement) Silica Flour and Various Fluid Loss Reducing Complexes

| Sulfonated Organic Compound Used, % by Weight of Dry Cement | | | | Polyethyleneimine, Gallon per Sack of Dry Cement Utilized[10] | | 180° F. Free Water (ml) | 180° F./ 1000 psi Fluid Loss (cc/30 min) | Thickening Time for 192° F. Liner Schedule (hours: minutes) |
|---|---|---|---|---|---|---|---|---|
| A[1] | B[2] | C[3] | D[4] | A[5] | B[6] | | | |
| 1.75[7] | — | — | — | 0.7 | — | — | B.O.[8] | — |
| 1.75 | — | — | — | 0.7 | — | — | 52 | 16:30+ |
| — | — | 1.0 | — | 0.6 | — | — | B.O. | — |
| — | — | 1.8 | — | 0.7 | — | — | B.O. | — |
| — | 1.4 | — | — | 0.7 | — | — | 325[11] | — |
| — | 1.7 | — | — | 0.7 | — | — | 92 | 1:16 |
| — | 2.0 | — | — | 0.7 | — | — | 147[11] | — |
| — | 1.7 | — | — | 0.8 | — | — | 126[11] | — |
| — | 1.7 | — | — | 0.5 | — | — | 258[11] | — |
| 0.8 | 0.9 | — | — | 0.7 | — | 1 | 12 | 6:00+ |
| 0.6 | 0.7 | — | — | 0.5 | — | 0 | 18 | 21:30+ |
| 0.4 | 0.44 | — | — | 0.7 | — | 0 | 40 | 13:26 |
| 0.4 | 0.44 | — | — | 0.35 | — | — | 329[11] | — |
| 0.2 | 0.6 | — | — | 0.5 | — | — | 184[11] | — |
| — | 0.7 | 0.6 | — | 0.5 | — | — | B.O. | — |
| — | 1.7 | — | — | — | 0.7 | — | B.O. | — |
| 0.4 | 0.44 | — | — | — | 0.5 | high[9] | 18 | 6:45+ |
| — | 0.44 | — | 0.4 | — | 0.5 | high | — | 7:24 |
| — | 0.44 | — | 0.4 | 0.5 | — | high | — | — |
| — | 0.8 | — | 0.8 | 0.5 | — | high | — | — |
| 0.2 | 1.7 | — | — | — | — | — | — | — |

[1]Sulfonated organic compound A is calcium lignosulfonate.
[2]Sulfonated organic compound B is naphthalene sulfonic acid condensed with formaldehyde having a molecular weight of about 8,000.
[3]Sulfonated organic compound C is naphthalene sulfonic acid condensed with formaldehyde having a molecular weight of about 2500.
[4]Sulfonated organic compound D is sodium lignosulfonate.
[5]Polyethyleneimine A is a blend of polyethyleneimine having a molecular weight of about 80,000 and polyvinylpyrrolidone.
[6]Polyethyleneimine B is substantially pure polyethyleneimine having a molecular weight of about 80,000.
[7]Dry blended in cement. All other test were conducted by predissolving the sulfonated material in the mix water, adding the polyethyleneimine and, finally, the dry blended cement, salt and silica flour.
[8]Blew out immediately.
[9]No definite boundary between fluid which did and did not contain cement particles. However, these slurries were characterized by unacceptable density segregation within the 250 ml graduated cylinder.
[10]One (1) sack equals 94 pounds of cement.
[11]Computed value.

From Table I it can be seen that lignosulfonic acid salts and naphthalene sulfonic acid condensed with formaldehyde having a molecular weight of about 8,000 achieve the best results. In addition, it can be seen that naphthalene sulfonic acid condensed with formaldehyde having a molecular weight of about 2500 does not function to produce a fluid loss reducing complex.

EXAMPLE 2

The procedure of Example 1 is repeated utilizing 5 different combinations of sulfonated organic compounds. Standard API viscosity and compressive strength tests are also carried out on the slurries. The results of these tests are given in Table II below.

TABLE II

Properties of 16.0 lb/gal Cement Slurries Comprised of Class H Cement, Sodium Chloride Saturated Fresh Water, 35% by Weight (dry cement) Silica Flour and Various Fluid Loss Reducing Complexes[3]

| Test No. | Sulfonated Organic Compound Used, % by Weight of Dry Cement A[1] | B[2] | Polyethylene-imine, gal. per Sack of Dry Cement Utilized[4] | 180° F. Free Water (ml) | 180° F./ 1000 psi Fluid Loss (cc/30 min) | Thickening Time for 192° F. Liner Schedule (hrs:min) | Readings Taken at Various RPM's on a FANN Model 35A Viscometer at 180° F. 600 RPM | 300 RPM | 200 RPM | 100 RPM | 24 Hour Compressive Strength at 250° F. (psi) |
|---|---|---|---|---|---|---|---|---|---|---|---|
| 1 | 0 | 0.8 | 0.5 | 0.5 | 46(60)[5] | 15:33 | — | — | — | — | — |
| 2 | 1.7 | 0 | 0.7 | — | 92 | 1:16 | — | — | — | — | — |
| 3 | 0.4 | 0.4 | 0.5 | 0.3 | 26 | 3:27 | 77 | 36 | 23 | 13 | 2690 |
| 4 | 0.5 | 0.5 | 0.5 | 0(1.5)[5] | 40 | 5:54 | 73 | 36 | 24 | 13 | 2860 |

[1]Sulfonated organic compound A is naphthalene sulfonic acid condensed with formaldehyde having a molecular weight of about 8,000.
[2]Sulfonated organic compound B is sodium lignosulfonate.
[3]All tests were conducted by predissolving the sulfonated material in the mix water, adding the polyethyleneimine and, finally, the dry blended cement, salt and silica flour.
[4]One (1) sack equals 94 pounds of cement.
[5]Repeat test.

From Table II it can be seen that polyethyleneimine and a mixture of a lignosulfonic acid salt and naphthalene sulfonic acid condensed with formaldehyde having a molecular weight of about 8,000 produce cement slurries having excellent fluid loss and other properties.

EXAMPLE 3

The effect of mixing order on viscosity and fluid loss is determined for various cement slurries of the present invention. The mix water is sea water and various components are added to the sea water in various orders followed by cement and silica flour. The components added to the slurries and the amounts thereof are as follows:

| Component | Amount Utilized | Identifying Designation Used in Table III |
|---|---|---|
| 50% by wt. aqueous solution of NaOH | 0.4 gal/bbl water | A |
| 40% by wt. aqueous solution of a sodium lignosulfonate | 0.12 gal/sack (94 lb.) of cement | B |
| 33% by wt. aqueous solution of naphthalene sulfonic acid condensed with formaldehyde having a MW of about 8,000 | 0.15 gal/sack (94 lb.) of cement | C |
| polyethyleneimine | 0.4 gal/sack (94 lb.) of cement | D |
| NaCl | 31% by weight of water | E |

The results of these tests are given in Table IV below.

TABLE III

Effect of Mixing Order on Properties of 16.2 lb/gal Salt Saturated Sea Water Cement Slurries Comprised of Class G Cement, 35% by weight (of dry cement) Silica Flour and Various Fluid Loss Reducing Complexes

| Order of Mix | | | | | 165° F. Atmospheric Consistometer (Bc) | | 165° F. Fluid Loss (cc/30 min) |
| 1st | 2nd | 3rd | 4th | 5th | Initial | 20 Min | |
|---|---|---|---|---|---|---|---|
| A | B | C[1] | D | E | 5 | 9 | 128[4] |
| A | C | B | D | E | 5 | 8 | 158[4] |
| A | D | B | C | E | 6 | 8 | 148[4] |
| E | A | B | C | D | 15 | 17 | 594[4] |
| B | C | D | A | E | 25 | 30 | B.O.[2] |
| B | C | D | E | A | 18 | 60[3] | — |

[1]Prepared as a 33% solution.
[2]Blew out immediately.
[3]Attained 60 Bc after 2 minutes, test terminated.
[4]Computed value.

From Table III it can be seen that treating the water with a base prior to adding the components which form the fluid loss reducing complex and the salt reduces the viscosity of the slurry. Also, the components forming the fluid loss reducing complex must be added to the water prior to adding the salt.

EXAMPLE 4

A liquid fluid loss reducing additive of the present invention is prepared by first combining sodium hydroxide with a quantity of fresh water to raise the pH to about 14. The additive is formed by combining polyethyleneimine in an amount of about 12% by weight of the additive, naphthalene sulfonic acid condensed with formaldehyde having a molecular weight of about 8,000 in an amount of about 2.5% by weight of the additive and a sodium lignosulfonate in an amount of about 2.5% by weight of the additive with the caustic water. The resulting additive contains the fluid loss reducing reaction product in an amount of about 17% by weight of the additive.

Portions of the additive described above are combined with salt saturated sea water to which a small amount of 50% sodium hydroxide is added. The water is then utilized to form a cement slurry by combining cement and silica flour therewith. The resulting slurries are tested for fluid loss, thickening time, viscosity, free water and compressive strength in accordance with standard API procedures. The results of these tests are set forth in Table IV below.

TABLE IV

Properties of 16.1 lb/gal Salt Saturated Sea Water Cement Slurries Comprised of Class G Cement, 35% by Weight (dry cement) Silica Flour and Fluid Loss Reducing Additive

| Fluid Loss Additive (gal/sk/gal/ 10 bbl)[1] | Mix Water (gal/sk) | 50% NaOH (gal/bbl) | Fluid Loss 126° F./ 1000 psi (cc/30 min) | Thickening Time-126° F. (hrs:min) | Atmospheric Consistometer (Bc) Init | Atmospheric Consistometer (Bc) 20 min | 80° F. Free Water (%) | 24 Hr/126° F. Compressive Strength (psi) |
|---|---|---|---|---|---|---|---|---|
| 0.53/30.6 | 6.7 | 0.25 | 140[2] | 7:37 | 3[3] | 3[3] | 0.5 | 1410 |
| 0.53/30.6 | 6.7 | 0 | 992[6] | — | 11[3] | 6[3] | — | — |
| 0.62/35.9 | 6.6 | 0.25 | 145 | 4:02 | 3[4] | 3[4] | — | 2140 |
| 0.79/44.9 | 6.4 | 0.25 | 130 | 4:05 | 3[5] | 3[5] | — | — |

[1]Gal/10 bbl total mixing solution, e.g., 42 gal fluid loss additive per 378 gal mix water is expressed as 42 gal/10 bbl. One sack equals 94 lbs. of cement.
[2]Average of 3 tests, 146, 146, 128 cc/30 minutes.
[3]At a simulated BHCT of 126° F. (7000 ft. casing).
[4]At a simulated BHCT of 150° F. (8670 ft. casing)
[5]At a simulated BHCT of 167° F. (10,200 ft. casing)
[6]Computed value.

From Table IV it can be seen that the fluid loss reducing additive of the present invention is effective in forming low fluid loss aqueous salt saturated cement slurries.

EXAMPLE 5

The fluid loss additive described in Example 4 is used to form cement slurries having various quantities of silica flour, calcium lignosulfonate and sodium silicate included therein. The slurries are tested for free water, fluid loss, thickening time and compressive strength in accordance with standard API procedures. The results of these tests are given in Table V below.

TABLE V

Properties of 16.5 lb/gal Salt Saturated Sea Water Cement Slurries Comprised of Class G Cement

| Mix Water[2] (gal/sk) | Silica Flour (% by wt of cmt) | 40% aqueous solution of calcium lignosulfonate (gal/10 bbl) | Sodium Silicate (gal/ 10 bbl) | Liquid Fluid Loss Additive (gal/10 bbl) | Atmospheric[1] Consistometer (Bc) Initial | Atmospheric[1] Consistometer (Bc) 20 Min | 80° F. Free Water (%) | BHCT[3] Test Temp (°F.) | Fluid Loss 325 Mesh Screen 1000 psi (cc/30 minutes) | Thickening Time (Hours: Minutes) | Compressive Strength 24 Hours (psi) |
|---|---|---|---|---|---|---|---|---|---|---|---|
| 4.74 | 0 | 0 | 3 | 42 | 5 | 5 | 0.4 | 126 | 96 | 5:00 | 2980 |
| 5.7 | 35 | 2 | 1.5 | 45 | 5 | 5 | 0.1 | 150 | 135 | 5:45 | 2570 |
| 5.7 | 35 | 2 | 1.5 | 45 | 4 | 7 | 0.1 | 167 | 145 | 4:57 | 2440 |

[1]Consistometer was preheated to BHCT.
[2]3 gal/10 bbl of 50% by wt. NaOH added to sea water.
[3]Fluid Loss, thickening time, and compressive strengths were determined at this temperature.

The preceding examples can be repeated with similar success by substituting the generically or specifically described reactants of this invention for those used in the examples. From the foregoing description, one skilled in the art can easily ascertain the essential characteristics of this invention, and without departing from the spirit and scope thereof, can make various changes and modifications to adapt the invention to various usages and conditions.

What is claimed is:

1. A low fluid loss aqueous salt saturated cement slurry comprising:

hydraulic cement; salt saturated water present in an amount sufficient to form a pumpable slurry; and a fluid loss reducing complex present in said slurry in an amount in the range of from about 0.25% to about 2.0% by weight of dry cement, said complex being comprised of the reaction product formed by admixing (i) polyethyleneimine having a molecular weight above about 50,000 and (ii) sulfonated organic compounds comprising an admixture of lignosulfonic acid salts having Na, Ca or NH4 as the associated cation, together with naphthalene sulfonic acid condensed with formaldehyde having a molecular weight above about 5,000, the ratio by weight of said polyethyleneimine to said sulfonated compounds in said complex, being in the range of from 1:1.4 to about 7.5:1, and the ratio by weight of said lignosulfonic acid salts to said naphthalene sulfonic acid condensed with formaldehyde in said complex being in the range of from about 1:5 to about 5:1, said reaction product being formed prior to admixture of said complex with either said hydraulic cement or with any substantial portion of said salt in said salt saturated water.

2. The slurry of claim 1 wherein said complex is comprised of the reaction product of said polyethyleneimine added in an amount in the range of from about 0.5% to about 1.5% by weight of dry cement utilized and said sulfonated organic compound added in an amount in the range of from about 0.2% to about 0.5% by weight of dry cement.

3. The slurry of claim 1 wherein said sulfonated organic compound is a mixture of sodium lignosulfonate and naphthalene sulfonic acid condensed with formaldehyde having a molecular weight of about 8,000.

4. The slurry of claim 3 wherein said complex is comprised of the reaction product of said polyethyleneimine added in an amount in the range of from about 0.5% to about 1.5% by weight of dry cement utilized, said sodium lignosulfonate added in an amount in the range of from about 0.1% to about 0.3% by weight of dry cement and said naphthalene sulfonic acid condensed with formaldehyde added in an amount in the range of from about 0.1% to about 0.3% by weight of dry cement.

5. The slurry of claim 4 wherein said salt saturated water is sodium chloride saturated sea water and said slurry is further characterized to include sodium hydroxide present in said slurry in an amount sufficient to precipitate any magnesium ion present in said sea water.

6. The slurry of claim 4 which is further characterized to include silica flour present in an amount of about 20% to about 40% by weight of dry cement utilized.

7. The slurry of claim 4 which is further characterized to include sodium silicate present in an amount in the range of from about 1.0% to about 3.0% by weight of dry cement utilized.

8. A liquid fluid loss reducing additive concentrate for aqueous cement slurries comprising:

fresh water; a base present in said water in an amount sufficient to raise the pH thereof to a level in the range of from about 13 to about 14; and the reaction product of (i) polyethyleneimine having a molecular weight above about 50,000 and (ii) sulfonated organic compounds comprising an admixture of lignosulfonic acid salts having Na, Ca, or $NH_4$ as the associated cation, together with naphthalene sulfonic acid condensed with formaldehyde having a molecular weight above about 5,000, the ratio by weight of said polyethyleneimine to said sulfonated compounds in said reaction product being in the range of from about 1:1.4 to about 7.5:1 and the ratio by weight of said lignosulfonic acid salt to said naphthalene sulfonic acid condensed with formaldehyde in said admixture of sulfonated organic compounds being in the range of from about 1:5 to about 5:1.

9. The additive of claim 8 wherein said base is selected from the group consisting of sodium hydroxide, potassium hydroxide and ammonium hydroxide.

10. The additive of claim 8 wherein said polyethyleneimine is added to said additive in an amount in the range of from about 7% to about 15% by weight of said additive and said sulfonated organic compound is added in an amount in the range of from about 2% to about 8% by weight of said additive.

11. The additive of claim 8 wherein said sulfonated organic compound is a mixture of sodium lignosulfonate and naphthalene sulfonic acid condensed with formaldehyde having a molecular weight of about 8,000.

12. The additive of claim 11 wherein said polyethyleneimine is added to said additive in an amount in the range of from about 7% to about 15% by weight of said additive, said sodium lignosulfonate is added in an amount in the range of from about 1% to about 5% by weight of said additive and said naphthalene sulfonic acid condensed with formaldehyde is added in an amount in the range of from about 1% to about 5% by weight of said additive.

* * * * *